Dec. 15, 1942.     R. LEPPLA     2,305,016
METAL TREAD
Filed Aug. 27, 1940

INVENTOR
Rudolph Leppla
BY
Evans & McCoy
ATTORNEYS

Patented Dec. 15, 1942

2,305,016

UNITED STATES PATENT OFFICE 2,305,016

METAL TREAD

Rudolph Leppla, Davenport, Iowa, assignor, by mesne assignments, to The Bettendorf Company, a corporation of Maryland Application August 27, 1940, Serial No. 354,405

4 Claims. (Cl. 189—82)

This invention relates to a metal tread, and in particular to a tread construction which is especially applicable to running board constructions for freight car roofs, brake steps, steps where a metal tread is desired, fire escapes, etc.

It is an object of the present invention to provide a metal tread, including a tread surface, which is rigid, sturdy and highly durable.

Another object is to provide a tread which may be readily secured in place and will be suitable for use as a structural member. For example, when a stair tread is desired, such as for a fire escape or a freight car brake step, the tread of the present invention will provide its own base; and to install it, it is merely necessary to secure it in place.

A further object is to provide a metal tread which will have its own base, thereby facilitating attachment, such base, however, having provisions for self-cleaning so that snow, dirt and the like will not remain on the tread surface.

Another object of the present invention is to provide a metal tread which is simple in design and construction and inexpensive to manufacture, but which will provide a good non-slip traction surface.

Other objects and advantages of the present invention will become apparent from the following detailed description accompanied by the drawing, in which like parts throughout the several views will be indicated by the same reference numerals. In the drawing.

Figure 1:
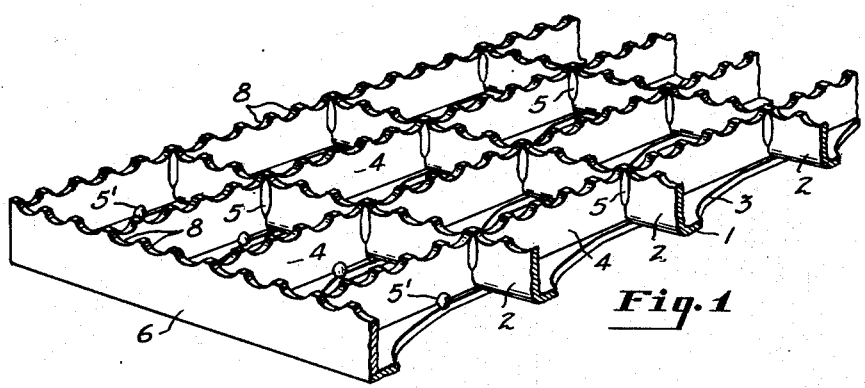
Figure 1 is a view in perspective of a portion of the tread in its assembled position.
Figure 2:
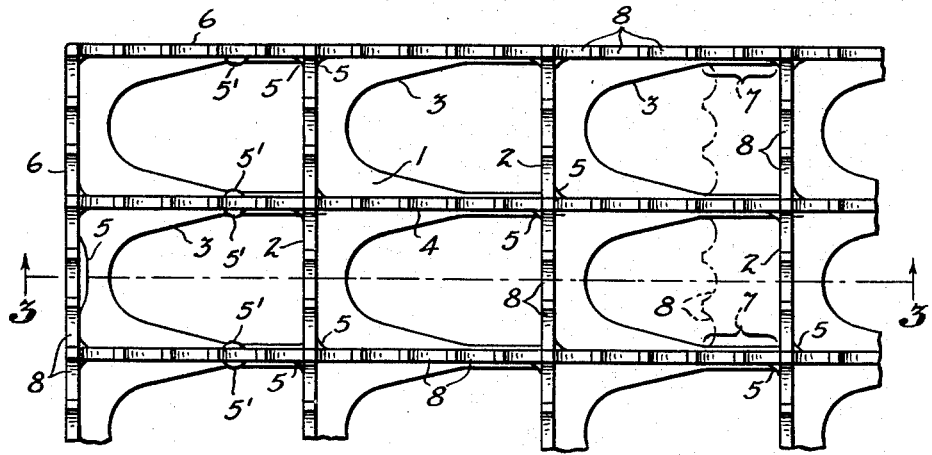
Fig. 2 is an enlarged plan view of the tread portion shown in Fig. 1.
Figure 3:
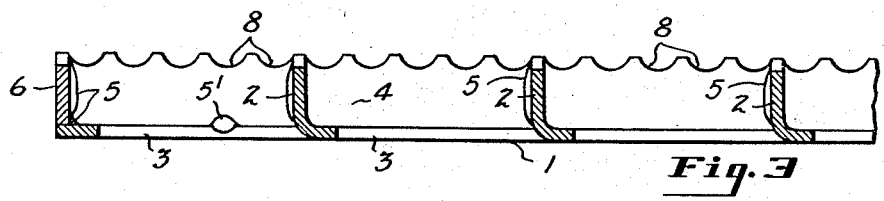
Fig. 3 is a sectional view taken substantially on line 3—3 of Fig. 2.

The tread comprises a base portion 1 having upstanding elements or tabs 2 struck therefrom. During the striking of the elements 2 from the base portion 1, considerably more metal is removed from the base portion than is necessary to form the elements 2, leaving apertures in the base indicated by the numeral 3. The elements 2 are disposed in substantially vertical position and located in a series of rows, each row including a plurality of the elements in spaced end to end relationship. In the spaces between adjacent upstanding elements 2 and extending for a plurality of rows are transverse bars or upstanding members 4 which may be secured to the elements 2 or the base portion 1 in any suitable manner. The bars 4 may be secured to the elements 2 by welding at the junction of the bars with each row of elements, as indicated by the numeral 5 in Figs. 1 to 3. An alternative method of securing the bars in place, which may partially or wholly replace the joinder of the bars to the elements 2 as indicated by the numeral 5, is the joinder indicated in Figs. 1 to 3 by the numeral 5'. In this instance the bars 4 are secured to the base portion in the narrow region of the base between adjacent apertures 3. The securing of the bars to the base portion in this region may be accomplished by spot welding or projection welding and is advantageous in view of the fact that it tends to strengthen the base portion 1 where its cross sectional area is relatively small.

If desired, suitable end bars or upstanding members 6 may be provided at the margins of the tread to provide a suitable tread border. Of course, other edge portions may be used around the margins of the tread, the bars 6 being shown by way of example. The upstanding marginal members 6 may be secured to the base portion 1 by welding, as indicated by the numeral 5 and the numeral 5' in Figs. 2 and 3.

Figure 4:
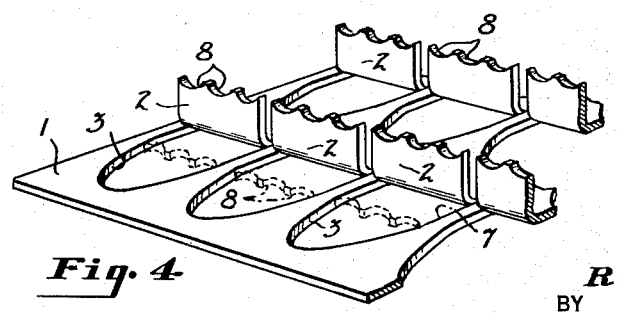
Fig. 4 is a perspective view of the base portion of the tread illustrating details of its manufacture.

In the formation of the base portion 1, the apertures 3 may be formed by punching, or other suitable means, and in the same operation or by a separate operation, slits or cuts may be formed in communication with the apertures 3 to define tabs or elements 2 which may be then struck from the surface of the base portion to their upstanding position. These slits or cuts are indicated by the numeral 7 in Figs. 2 and 4. Fig. 4 shows in dotted outlines the positions of the tabs or elements 2 after the apertures 3 and the slits 7 have been formed but before the elements 2 have been turned to their upstanding position.

The top edges of the elements 2 and the bars 4 and 6 may be configured in any suitable manner to provide a tread surface. As shown in the drawing, the configurations may be regularly spaced serrations 8, formed in the top edges of the respective members.

The tread may be made of any suitable material which will be able to withstand the hard usage necessary for treads which are used as structural elements. When the tread is used for a running board construction it is preferable that it be formed of a steel tough enough to withstand the hard usage and exposure to the weather, but having sufficient machinability to allow its being formed by punching, as has been previously described.

The tread provided by the present invention is advantageous in that high rigidity and durability are obtained. Since this construction provides a tread having a base portion integral with one of the members constituting the tread surface, the strength of the tread is materially increased. The feature of having the bars 4 disposed transversely to the struck out elements 2 and securely fastened to the tread aids in strengthening the tread as a whole as well as furnishing support for the upstanding elements 2. When the bars 4 are secured to the base portion 1 at the locations indicated by the numeral 5' (Figs. 1-3) the base portion is strengthened and the bars 4 are firmly united to the base of the tread. This tread construction of the present invention is much stronger for its weight than a tread constructed of two series of bars disposed in a grill arrangement and secured together.

Due to the relatively large area of apertures in the base portion, the tread is of the type which will stay clean, that is, snow, dirt, etc. deposited on the tread surface will freely pass through the aperture in the base portion of the tread. Further, the tread is provided with a base portion which facilitates securing the tread in its proper location. The traction surface of the tread may be configured to give the desired amount of traction for the use to which the tread is to be put.

It is to be understood that variations and modifications of the specific devices herein shown and described for purposes of illustration, may be made without departing from the spirit of the invention.

What I claim is:

1. A metal tread which comprises a base plate having integral, upstanding tabs of uniform height and length struck up therefrom and disposed in a plurality of rows, each row comprising a series of tabs uniformly spaced, end to end, with narrow spaces between the tab ends, the spaces between the tab ends in said rows being alined transversely, and a plurality of bars of a width corresponding to the height of said tabs and of a thickness to substantially fit in said spaces between the tab ends, each of said bars being disposed on edge upon the base plate in alined spaces between the tab ends, and secured to said base and to the contiguous ends of said tabs, the top edges of said tabs and bars being configured to provide a tread surface.

2. A metal tread which comprises a base plate having integral, upstanding tabs of uniform height and length struck up therefrom and disposed in a plurality of rows, each row comprising a series of tabs uniformly spaced, end to end, with narrow spaces between the tab ends, the spaces between the tab ends in said rows being alined transversely, and a plurality of bars of a width corresponding to the height of said tabs and of a thickness to substantially fit in said spaces between the tab ends, each of said bars being disposed on edge upon the base plate in alined spaces between the tab ends, said bars being secured by welding to said base plate and to the contiguous ends of said tabs.

3. A metal tread which comprises a base plate having integral, upstanding tabs of uniform height and length struck up therefrom and disposed in a plurality of rows, each row comprising a series of tabs uniformly spaced, end to end, with narrow spaces between the tab ends, the spaces between the tab ends in said rows being alined transversely, a plurality of bars of a width corresponding to the height of said tabs and of a thickness to substantially fit in said spaces between the tab ends, each of said bars being disposed on edge upon the base plate in alined spaces between the tab ends, and secured to said tab ends, and marginal members of a height corresponding to that of the tabs and bars rigidly secured to marginal portions of said base plate and to adjacent ends of said tabs and bars.

4. A metal tread which comprises a base plate having integral, upstanding tabs of uniform height and length struck up therefrom and disposed in a plurality of rows, each row comprising a series of tabs uniformly spaced, end to end, with narrow spaces between the tab ends, the spaces between the tab ends in said rows being alined transversely, said base plate having an opening extending from the base of each tab toward an adjacent row of tabs, certain of the openings being of a length greater than the height of the tab struck up from the opening and less than the distance between adjacent rows of tabs, said apertures tapering toward the tabs from which they are spaced, and a plurality of bars of a width corresponding to the height of said tabs and of a thickness to substantially fit in said spaces between the tab ends, each of said bars being disposed on edge upon the base plate in alined spaces between the tab ends, and secured to said base and to the contiguous ends of said tabs, the top edges of said tabs and bars being configured to provide a tread surface.

RUDOLPH LEPPLA.